No. 656,617. Patented Aug. 21, 1900.
J. W. SMALLMAN.
HAULAGE CLIP.
(Application filed Dec. 28, 1897.)

(No Model.)

WITNESSES:
R. Smallman.
W. Eames.

INVENTOR:
James W. Smallman.

UNITED STATES PATENT OFFICE.

JAMES W. SMALLMAN, OF CAMP HILL GRANGE, NEAR NUNEATON, ENGLAND.

HAULAGE-CLIP.

SPECIFICATION forming part of Letters Patent No. 656,617, dated August 21, 1900.

Application filed December 28, 1897. Serial No. 663,947. (No model.)

*To all whom it may concern:*

Be it known that I, JAMES WILLIAM SMALLMAN, a subject of the Queen of Great Britain and Ireland, residing at Camp Hill Grange, near Nuneaton, in the county of Warwick, England, have invented a new and useful Haulage-Clip, (in respect whereof I have obtained a patent in Great Britain, No. 23,082, bearing date December 3, 1895,) of which the following is a specification.

This invention relates to an improved clip for enabling tubs or wagons to be readily attached to and detached from an endless-wire haulage-rope traveling continuously.

The accompanying drawings illustrate a clip made in accordance with my invention.

Figure 1:
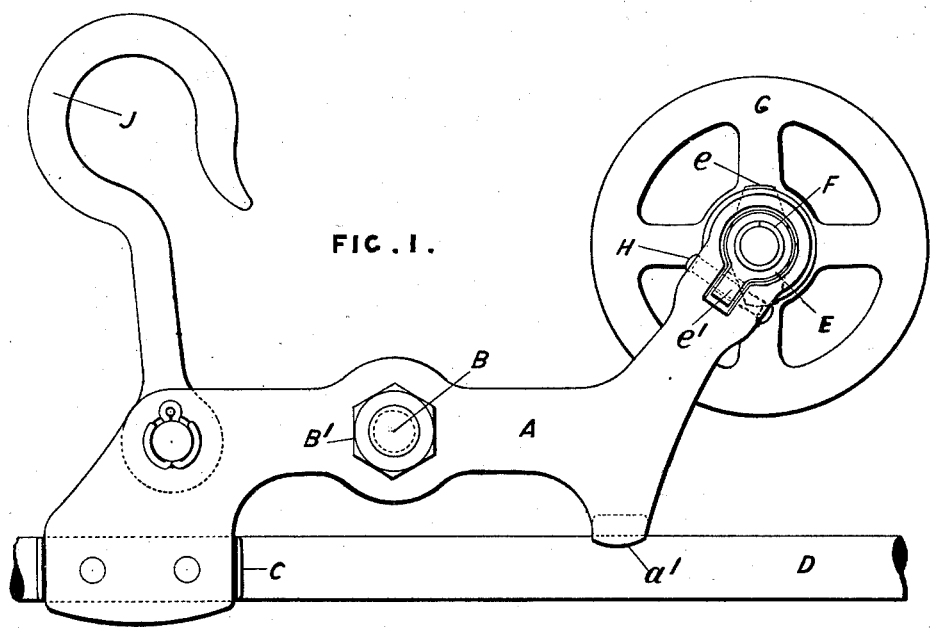
Figure 2:
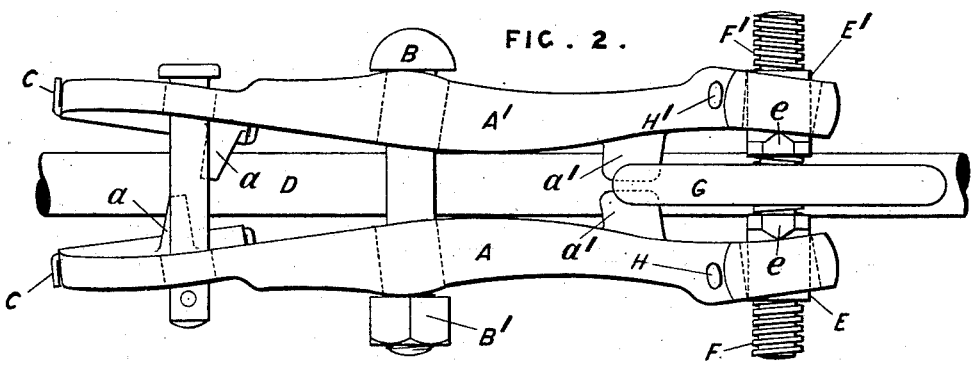
Figure 3:
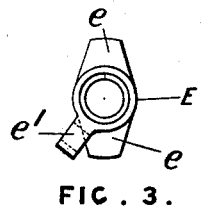

Figure 1 is a side elevation representing the clip with the side pieces gripping the rope. Fig. 2 is a plan showing the clip with the side pieces not gripping the rope, the coupling-hook being omitted. Fig. 3 is an end elevation of the right-hand nut.

A and A' are two side pieces.

B is a transverse bolt furnished with a nut B'.

C represent steel liners which fit against the rope D. These liners are interchangeable. Each liner is secured by two rivets to the grooved lower portion of one of the side pieces.

E and E' are nuts held by the side pieces.

F and F' are right-hand and left-hand screws working in the nuts E and E'. These screws may be in one piece and are fixed in the boss of a hand-wheel G. The nut E has lumps $e$, that rock against the top of the side piece A.

H is a rivet that passes through a hole in a projection $e'$ on the nut E. This rivet serves to keep the nut in the side piece when the clip is not gripping the rope. The nut E is prevented from turning by the projection $e'$. The nut E' corresponds with the nut E and is retained in the side piece A' by the rivet H'.

$a$ and $a'$ are projections which lie on the rope and support the clip until the side pieces have been caused to grip the rope, these projections greatly facilitating the manipulation of the clip.

J is a coupling-hook for connecting the clip to the tub or wagon. The clip is adjusted to fit any particular rope or to compensate for wear by turning the nut B', which should be screwed tightly on the bolt B. The holes in the side pieces through which the bolt B passes are shaped to correspond with the neck of that bolt in order to hold said bolt while the nut B' is turned. The side pieces grip the rope when the hand-wheel G is turned in one direction and release the rope when said hand-wheel is turned in the opposite direction.

What I claim as my invention, and desire to secure by Letters Patent, is—

1. In a haulage-clip, the combination of two side pieces, a transverse bolt and nut loosely connecting said side pieces, right-hand and left-hand screws and a hand-wheel for causing the screws to act on the tops of the side pieces, substantially as set forth.

2. In a haulage-clip, the combination of two side pieces the upper portions of which extend forward, a transverse bolt and nut loosely connecting said side pieces, nuts held by the said side pieces, right-hand and left-hand screws engaging with the nuts held by the said side pieces, and a hand-wheel united to the screws, substantially as set forth.

3. In a haulage-clip, the combination of two side pieces A and A', a transverse bolt B and nut B', nuts E and E', right-hand and left-hand screws F and F', a hand-wheel G, and projections $a$ and $a'$, substantially as set forth.

JAMES W. SMALLMAN.

Witnesses:
 R. SMALLMAN,
 W. EAMES.